Figure 9:
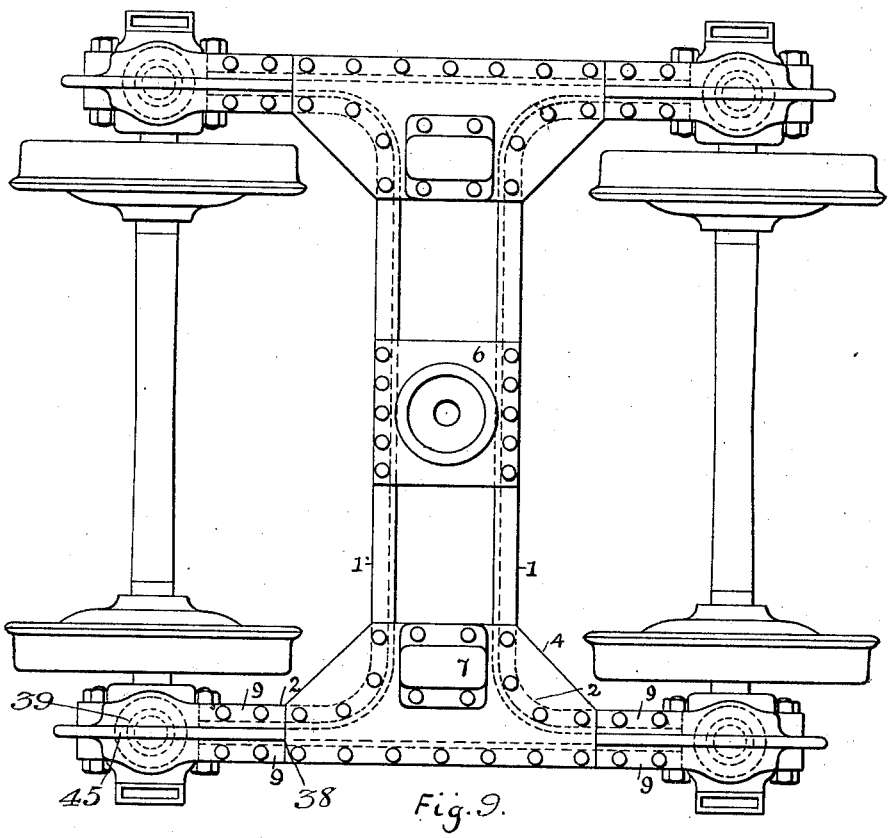

No. 686,794. Patented Nov. 19, 1901.
R. C. WRIGHT & F. E. STEBBINS.
CAR TRUCK.
(Application filed Feb. 5, 1896.)
(No Model.) 6 Sheets—Sheet 1.
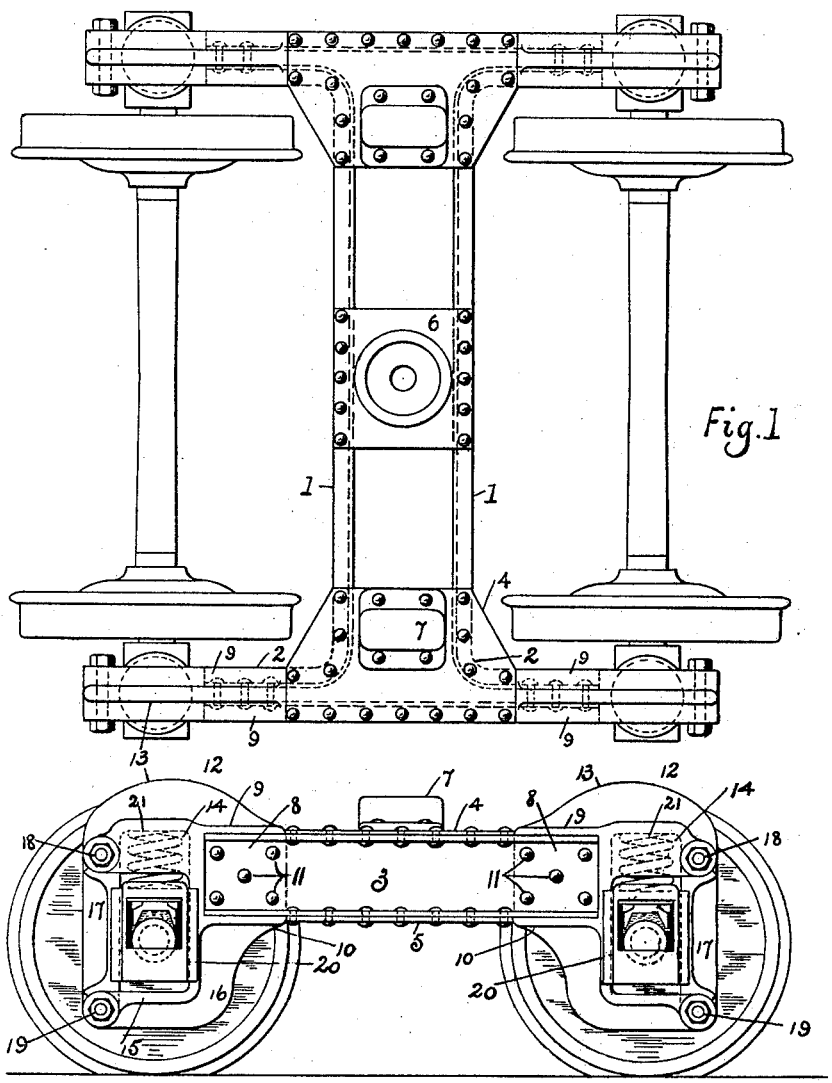

No. 686,794. Patented Nov. 19, 1901.
R. C. WRIGHT & F. E. STEBBINS.
CAR TRUCK.
(Application filed Feb. 5, 1896.)
(No Model.) 6 Sheets—Sheet 2.
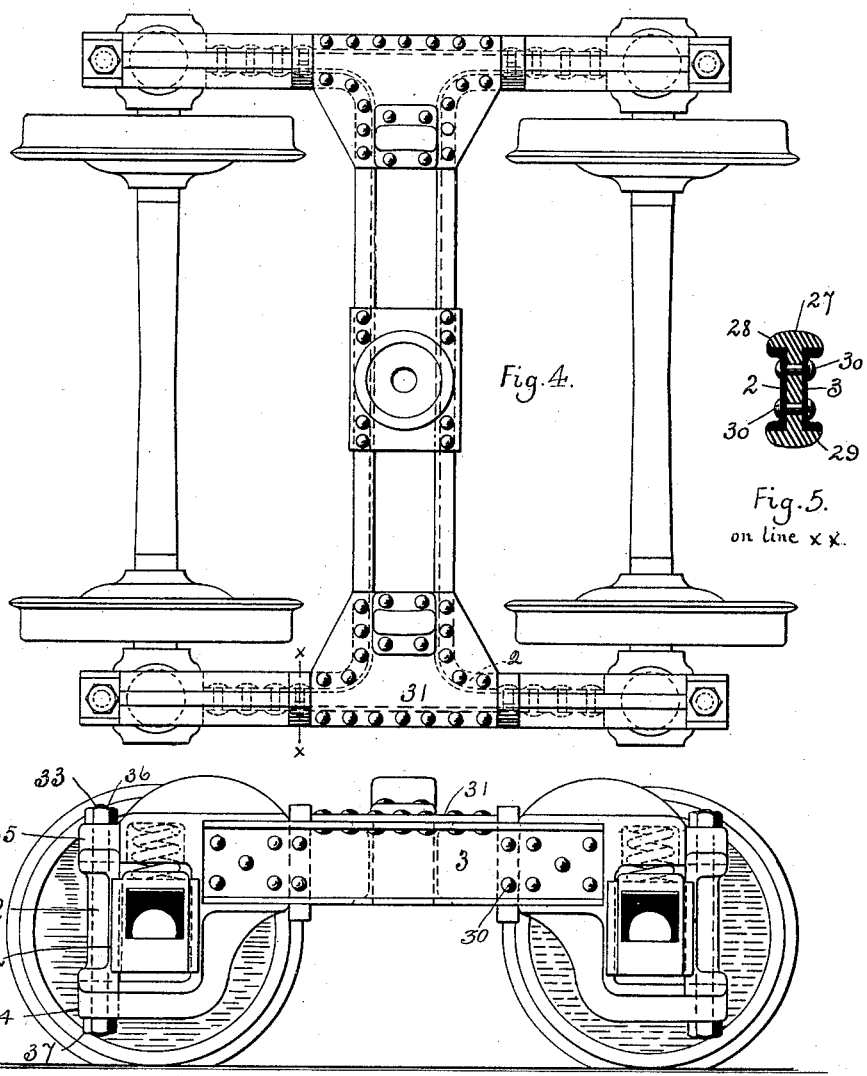

No. 686,794. Patented Nov. 19, 1901.
R. C. WRIGHT & F. E. STEBBINS.
CAR TRUCK.
(Application filed Feb. 5, 1896.)
(No Model.) 6 Sheets—Sheet 3.
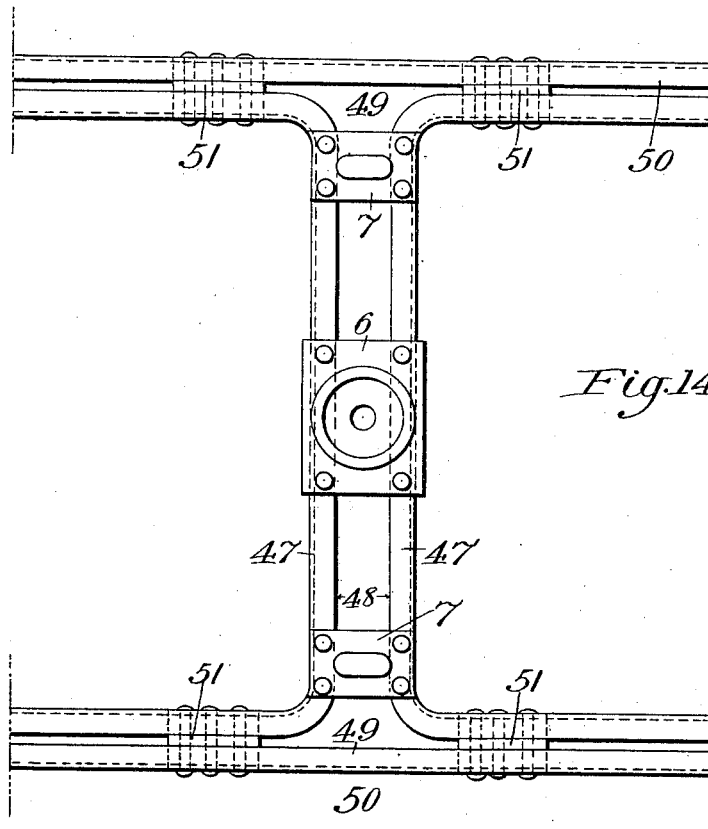
*Fig.14.*
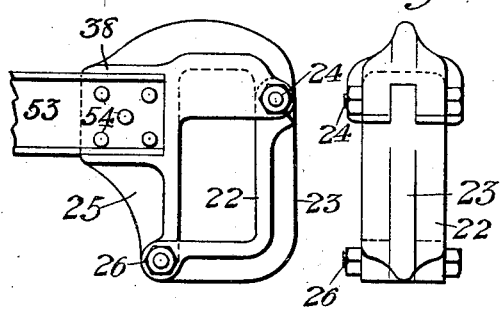
*Fig.15.* *Fig.16.*
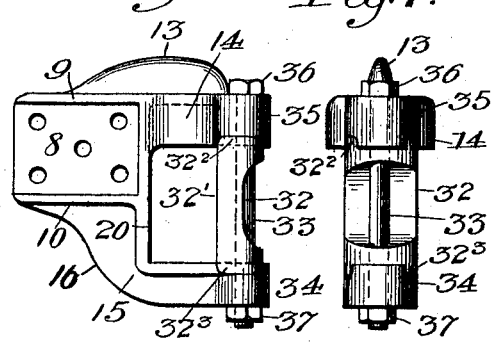
*Fig.6.* *Fig.7.*
Witnesses:
D. W. Edelin.
Chas. H. Baker.
Inventors:
R. C. Wright and
F. E. Stebbins.
By F. E. Stebbins, Atty.

No. 686,794. Patented Nov. 19, 1901.
R. C. WRIGHT & F. E. STEBBINS.
CAR TRUCK.
(Application filed Feb. 5, 1896.)
(No Model.) 6 Sheets—Sheet 4.

WITNESSES:
INVENTORS:
Ransom C. Wright.
Frank E. Stebbins.

No. 686,794. Patented Nov. 19, 1901.
R. C. WRIGHT & F. E. STEBBINS.
CAR TRUCK.
(Application filed Feb. 5, 1896.)
(No Model.) 6 Sheets—Sheet 5.
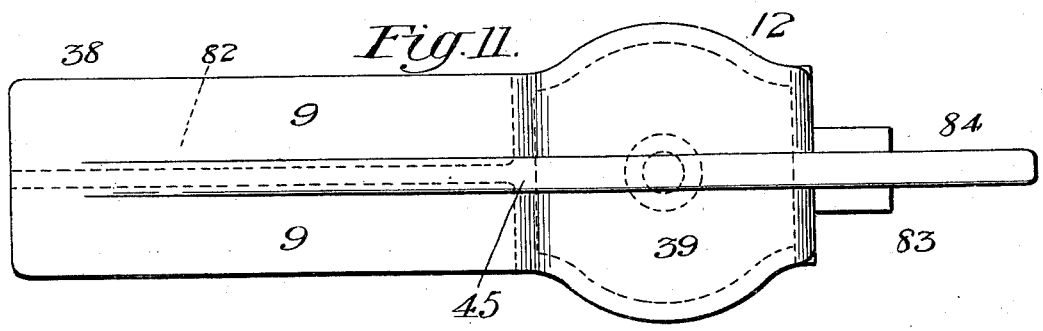
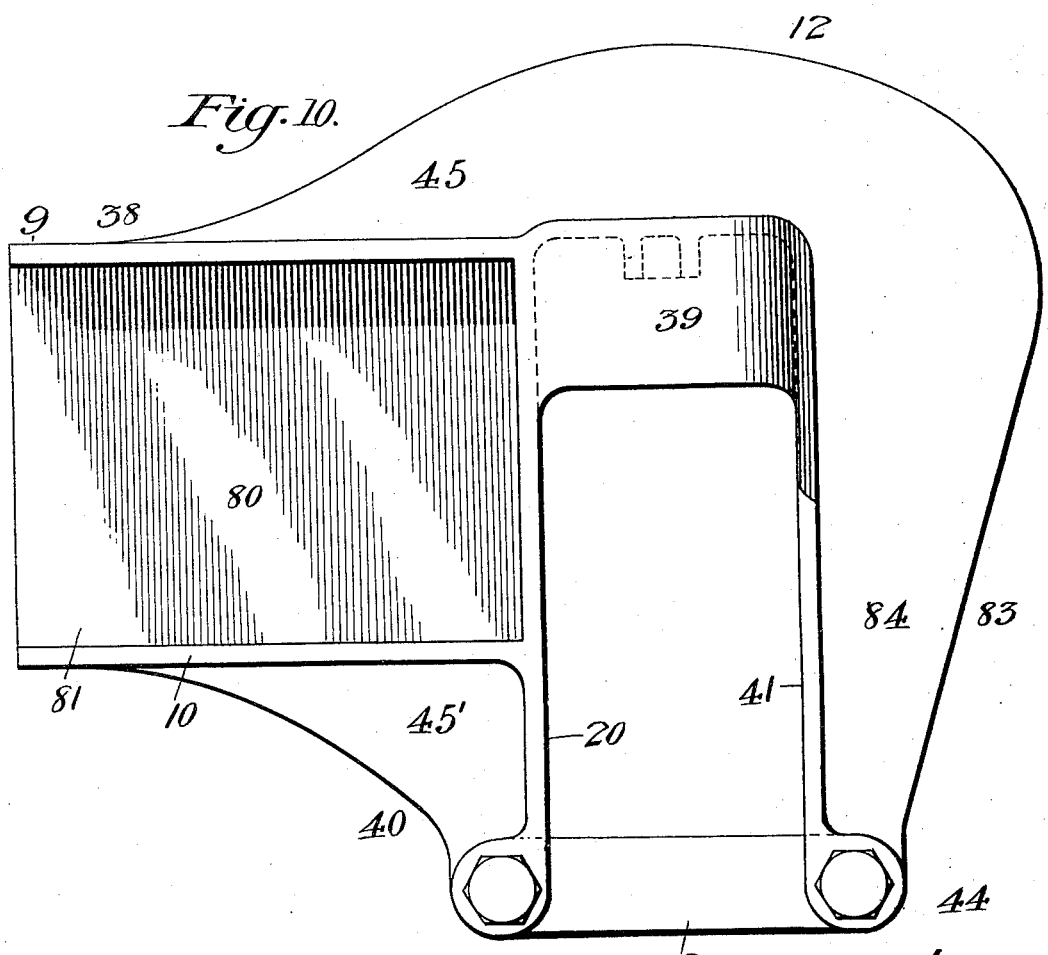

No. 686,794. Patented Nov. 19, 1901.
R. C. WRIGHT & F. E. STEBBINS.
CAR TRUCK.
(Application filed Feb. 5, 1896.)
(No Model.) 6 Sheets—Sheet 6.
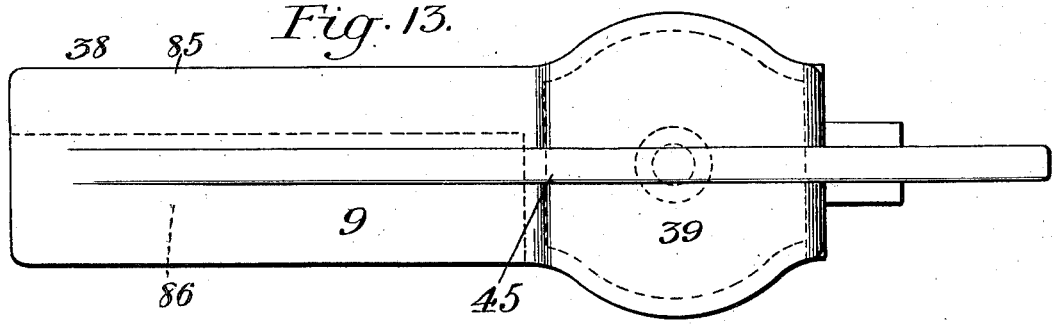
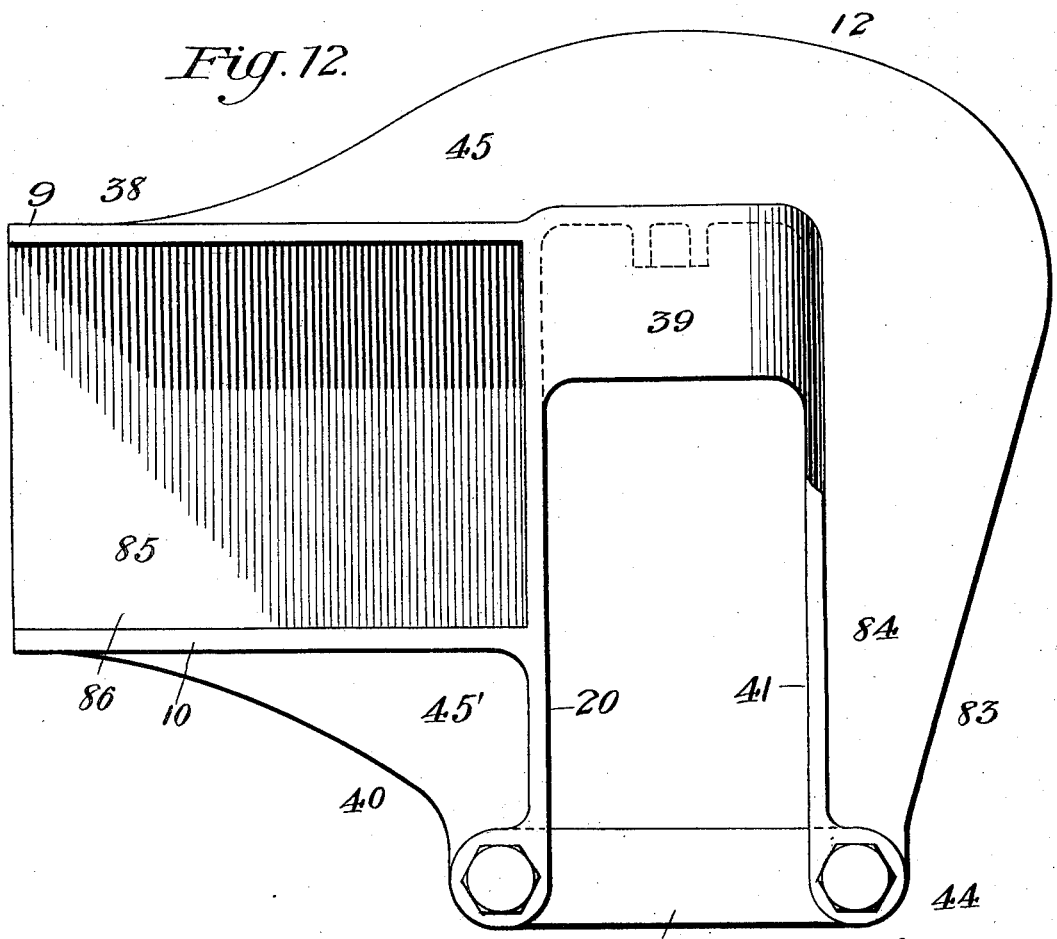
Witnesses:
D. W. Edelin.
Chas. H. Baker.
Inventors.
R. C. Wright
F. E. Stebbins,
By F. E. Stebbins, Atty.
THE NORRIS PETERS CO., PHOTO-LITHO., WASHINGTON, D. C.

UNITED STATES PATENT OFFICE.

RANSOM C. WRIGHT, OF PHILADELPHIA, PENNSYLVANIA, AND FRANK E. STEBBINS, OF WASHINGTON, DISTRICT OF COLUMBIA; SAID STEBBINS ASSIGNOR TO SAID WRIGHT.

CAR-TRUCK.

SPECIFICATION forming part of Letters Patent No. 686,794, dated November 19, 1901.

Application filed February 5, 1896. Serial No. 578,163. (No model.)

*To all whom it may concern:*

Be it known that we, RANSOM C. WRIGHT, residing at Philadelphia, county of Philadelphia, State of Pennsylvania, and FRANK E. STEBBINS, residing at Washington, District of Columbia, citizens of the United States, have jointly invented certain new and useful Improvements in the Construction of Car-Trucks, of which the following is a description sufficiently full, clear, and accurate as will enable those skilled in the art to take the necessary steps and produce the same.

The improvements relate to the making of both the frames and pedestals of trucks for carrying freight and other cars. The standard freight-car is designed to carry a load of from sixty thousand to one hundred thousand pounds. Trucks to carry such a load, in addition to the weight of the car-body, which may be from twenty thousand to thirty-five thousand pounds, must necessarily be very strong and rigid. Inasmuch as the side frames are usually united only by the transom or transoms between the pairs of wheels and axles, which transom or transoms supports or support the entire weight of the car-body and load generally at the center, a very secure and rigid union of the sides and transom or transoms is requisite to keep the side frames parallel and prevent the truck-frame from "getting out of square." While traversing curves the flanges of the wheels are thrown with great force against the outer rail of the track, and consequently the truck-frame and pedestals are subjected to violent strains. In applying inside-hung brakes to the wheels on heavily-loaded cars and in buffing enormous outward pressure and blows are imparted to the legs of the pedestals. To fulfil the conditions of this severe service, four styles of trucks have heretofore been designed.

First, the well-known "diamond" type. This truck is objectionable by reason of the great number of parts of which it is composed, the absence of springs between the side frames and journal-boxes, its great weight, the time, labor, and difficulty of inspecting it to see that the innumerable bolts, nuts, and other parts are in their proper positions, its tendency to get out of square, and bending at the points where the side bars join the transoms and between these points and the journal-boxes, which results in tipping the journal-boxes sidewise and wearing the brasses unevenly.

Second, the truck having solid side frames each made of a single piece of sheet-steel pressed to shape. The objections to this type are: The very best quality of steel is required in its construction. Special rolled plates of very large dimensions must be used to allow the pedestals to be made integral with the side frame, thus increasing the cost. A special plant with special tools and large and costly dies are required for its manufacture. Should the frame become bent, the entire side must be discarded or it must be transported to the special plant and there restored to its proper shape with much labor. Its light weight, however, recommends it as compared with the diamond construction.

Third, the truck having each side frame of integral cast-steel. This type is objectionable on account of the liability of imperfections in the casting, the difficulty in uniting the side frames to the transoms securely and rigidly, and the necessity of discarding an entire side when a part thereof becomes broken.

The fourth style or type, made up of iron or steel shapes having the pedestals integral or partly integral with the side frames, is perhaps less objectionable than the other types. Still this truck has a multiplicity of parts and requires the use of special tools and manifold manipulations in its manufacture. When bent out of shape, it must be re-formed by heat and press or hammer, and when a pedestal is broken an entire side must be discarded or repairs made with much difficulty.

The purposes of our invention are to avoid the objections appertaining to these and other types of construction and to produce a truck-frame which shall be comparatively cheap in first cost, made up of a few but a suitable number of parts, easily constructed in the ordinary car-shop without the use of unusual, unfamiliar, and expensive tools, easily repaired by the removal and substitution of a part, which shall have great rigidity and strength, specially at the angles adjacent the sides thereof, thus keeping the frame square, which will not bend vertically between the journal-boxes and transom or transoms, which shall be of comparatively light weight, easily and quickly inspected, and the pedestals of such construction that should one become broken another can be substituted, and which in certain forms of construction will allow the quick and facile removal and replacement of the car wheels and axles.

With these main ends in view our invention consists, *imprimis*, in constructing the frame, embracing the transom or transoms and side frames, of iron or steel plates or beams or shapes rolled or pressed, having the webs of the side frames and also, preferably, the transom or transoms in veritcal planes and attaching to the ends of the said beams or frames or side pieces and transoms, or either, pedestals adapted to receive and hold the journal-boxes and axles.

It further consists in a truck-frame comprising a transom or transoms adapted to support the car-body and load, flanged side pieces secured to the ends of the transom or transoms, and cast pedestals attached directly onto the free ends of the side pieces by rivets or bolts.

Further, it consists in forming the main frame of flanged beams constituting the transom or transoms and of side pieces or beams and uniting the transom or transoms to the side pieces adjacent the central portions of the latter and securing upon the ends of the said side pieces cast-metal pedestals having extensions or necks and adapted to receive the journal-boxes and bearing-springs when the latter are used.

Further, it consists in forming the main frame by fashioning or bending two flanged metal beams to constitute the transoms and portions of the side frames and connecting them with straight metal beams forming other parts of the side frames, the frames as a whole adapted to receive pedestals at their free ends.

Still further, it consists in forming pedestals of novel shapes and adapted to be secured to the ends of the main frame.

Finally, it consists in certain novel ways of constructing the transom or transoms and various parts of the pedestals and uniting them to the frame, joining the transom or transoms to the side pieces and forming and combining the several elements and parts, as will be substantially hereinafter set forth and claimed.

The accompanying drawings illustrate by way of example truck-frames and pedestals made by the best modes we have so far devised and by modes involving modifications; but we do not by reason of the absence of illustrations of other forms or examples intend to exclude other and equivalent modes of constructing and embodying the principle.

Figure 8:
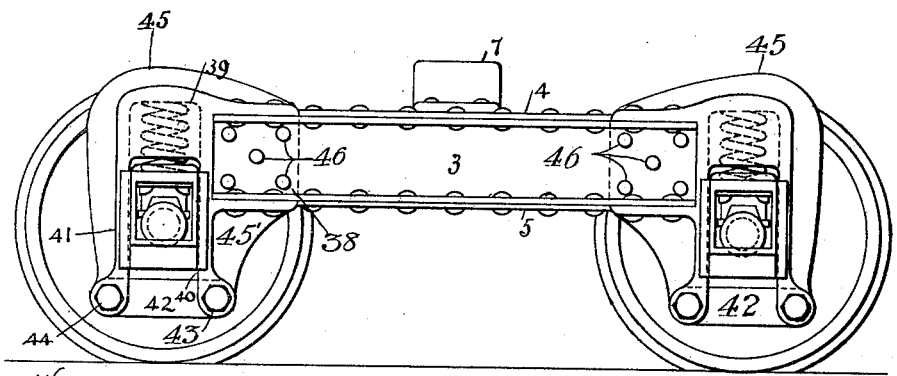

Figures 1 and 2 show, respectively, plan and side views of one form and construction of our truck-frames and pedestals with wheels and axles, journal-boxes, and springs in their relative positions. Figs. 3 and 4 are views of another example of our truck-frames with wheels and axles, journal-boxes, and springs in position, the pedestals being of a special and novel construction. These views also show two desirable ways of connecting the transoms to the side pieces, both or one only of which may be used. Fig. 5 is a section on line $xx$ of Fig. 4, showing a flanged filling or connecting piece. Figs. 6 and 7 on Sheet 6 are detail views of one of the pedestals detached from the frame. Figs. 8 and 9 are views of a truck-frame having pedestals in position and open at the ends of the perpendicular pedestal-jaws. Figs. 10 and 11 are respectively enlarged side and top plan views of one of the pedestals shown in Figs. 8 and 9 detached from the frame. Figs. 12 and 13 are respectively enlarged side and top plan views of a pedestal similar to that shown in Figs. 10 and 11, but having its horizontal projecting extension or neck adapted to be attached to the end of a single metal beam by rivets or bolts. Fig. 14 shows a section of a frame without pedestals, in which the flanges of the bent transoms and side pieces are turned toward each other. Figs. 15 and 16 illustrate a modified form and construction of pedestal and a channel-beam riveted to the extension or neck of the pedestal and constituting a side frame.

The main part of the frame of the truck, excluding the pedestals and embracing the side beams or frames and transoms, we construct of iron or steel plates or beams or shapes pressed or cast or rolled, preferably of rolled merchant shapes, sizes, and weights, which can be purchased cheaply in open market. We prefer to use steel channels of from ten inches to fifteen inches in depth, the greatest depth of beam consistent with other conditions to which it is necessary to conform being selected. The beams for the transoms may be used as they are fashioned at the mills, being cut off to the required length, or, if desired, bent at the ends and of greater weight or having wider flanges than those which constitute the sides, when the sides are flanged, to the end of securing a very rigid union at the corner or angle, so as to keep the truck-frame square. The transom-beams in the preferred form of construction we fashion or bend to a U shape in any well-known way by heating them in a furnace and subjecting them to pressure in a bending-machine or pressing them to shape by a hydraulic forge or by casting. They may be given proper dimensions and shape or form in the process of manufacture at the mills or be of composite structure. In some cases we unite the transom-beams and side pieces which form the side frames by rolled plates and connecting pieces or angles in such a way as to stiffen the frame and so that the weight of the load at first taken by the transoms will in part or wholly be transferred to the side pieces and thence to the journal-boxes. For the same purpose we place filling-pieces between the ends of the bent or U-shaped transoms and side pieces and rivet them *in situ*, and the plates and filling-pieces may both be used in one structure. When the flanges of the side pieces are turned outwardly, we use an I or ꓶ filling-piece, the flanges overlapping the flanges of the transoms and side pieces. When the flanges are reversed, we locate the filling-pieces between and within the troughs of the channels—for example, as in Fig. 14. We may in some cases make one beam wider than the other, so that the narrower shall fit within the wider and the flanges perform the functions of filling-pieces. A good plan is to locate the side pieces some distance (one-half inch or more) from the bent transom ends, for such disposition will increase the stiffness of the side frames. The union of the transom or transoms and side pieces in all forms is rendered very rigid by the addition of rolled or pressed steel plates riveted to the beams either above or below, or both, as shown, for example, in Fig. 2. When employed, they may support the side bearings. In some cases we fasten the transom ends directly to the sides by connecting pieces, plates, and rivets, or otherwise. To the ends of the side frames or side pieces or beams or transoms, or to or between the side pieces and the parallel ends of the U-beams, we fasten the pedestals by rivets or bolts. They may be electrically welded in place, but we prefer to attach them so that a pedestal can easily be removed when broken or damaged and a perfect one substituted therefor. When the ends of the U-beams constitute a part of the side frames and are shorter than the side beams or pieces, the pedestals are to be attached to the side pieces only, and vice versa. The pedestals we preferably form with extended portions or necks having flanges, through which extended portions are made holes for the passage of rivets or bolts, which unite them to the side frames or side pieces and transom ends or to either said elements. We preferably make these pedestals of cast-steel or malleable or wrought metal and of any desirable shape. When made of cast metal, one of the jaws— that one adjacent the extension—is preferably integral with the head, and the other may be integral or removable. Between the jaws we make a bearing or seat for a journal-box spring or a spring-pocket to partly inclose the spring, which gives additional strength to resist the blows from the journal-box. The pocket is the preferred form of construction, made or cast integral with the pedestal. Flanges or webs integral with the extension or neck, head, and jaws and of any suitable form or shape and dimensions are also added to secure requisite strength.

The main parts of the truck-frame, constructed, substantially as described, of beams of proper depth and with a transom or transoms having flanges of proper widths, are very stiff, practically indestructible, will keep their shapes under the severest strains even when the wheels are off the track, and the frame as a whole will require practically no repairs except now and then a new coat of paint. The pedestals are the only elements subjected to excessive wear and liable to become broken, and these we have formed separate from the beams or main frame, so that substitution can easily and cheaply be made.

The several pictured examples or specimens of truck-frames and pedestals made by our way or method of constructing are specifically described as follows:

In Figs. 1 and 2 the numeral 1 designates the transoms, having curved or bent ends 2, constituting portions of the side frames. They are in this instance channel-beams about twelve inches deep, spaced apart and with the flanges turned outwardly. The side pieces 3 are located about one-half inch from the transoms and parallel with the bent ends thereof, as shown. The side pieces and the transoms are firmly secured one to the other by the rolled metallic plates 4 and 5 above and below, riveted to the flanges of both the side pieces and transoms. A plate 6, adapted to support a car-body, unites the transoms at the center. Side bearings 7 are secured to metallic plates 4. Each pedestal has an extension or neck 8 provided with a web and recesses or seats on each side, within which are snugly fitted the end of the transom 2 and the end of the side piece 3 on each side. Horizontal flanges 9 and 10 of the extension or neck overlap the flanges of the channels 2 and 3 at the top and bottom, so that when the several parts have been securely fastened together by rivets 11 the said flanges 10 will in part take the perpendicular strains and prevent the shearing of the rivets. The numeral 12 designates the head of the pedestal; 13, a strengthening-flange extending over the head and neck for the purpose of securing sufficient depth of beam; 14, a spring-pocket for retaining the coiled spring, as shown, in position and for increasing the strength of the head, the pocket being quite important, for its walls are located where the weight of the load is transmitted from the end of the frame to the journal-box. 15 is a jaw, in this case extending perpendicularly and then horizontally under the journal-box; 16, a flange extending along the jaw from the flanges 10; 17, a removable jaw having a strengthening-flange and a bearing-flange to engage the box and secured to the head and to the jaw 15 by bolts 18 19. The journal-box has vertical movement between the jaw 17 and the flange 20 of the other pedestal leg or jaw. A single or double coiled spring 21, partly in dotted lines, is interposed between the box and the pedestal, the pocket receiving and confining the upper end of the spring. When a pair of wheels and an axle are to be taken out, the frame is jacked up at one end and jaws 17 on each side removed entirely or each freed at one end and swung away from the pedestal, so that openings will be made for the boxes to pass out.

Figs. 3, 4, 5, 6, and 7 show a truck involving novel forms and elements of construction. The transoms and sides and main parts of the pedestals are similar to those shown in Figs. 1 and 2. The sectional view, Fig. 5, illustrates a way of both stiffening the frame and rigidly joining the transoms to the side pieces, so that part of the load or weight will be transferred to the latter; but filling-pieces are not necessary in all cases where the transoms have curved ends. The numeral 27 designates a filling-piece, of which there are four, located between beams 2 and 3 and having flanged heads 28 and 29 overlapping the edges of the beams. Rivets 30 secure the elements together. The end of each beam 2 is about one-half of an inch from beam 3, and as thus located the stiffness of the side frames is increased. In this truck a rolled or pressed steel plate 31 is shown riveted to the flanges of both the transoms and side pieces; but this may, if desired, be omitted when the filling-pieces are of sufficient width to give the required rigidity. The pedestal in this example (see Figs. 6 and 7) is somewhat like that illustrated in Figs. 1 and 2, with the exception of the removable jaw or leg. This consists of a perforated bearing-piece or jaw 32, having a plane surface $32'$, which is frictionally engaged by the journal-box, and projecting flanges $32^2$ and $32^3$ at the ends, which lap over or engage the projection 35 of the pedestal-head and the sides of the extension of the jaw 15, as shown. A threaded bolt 33 passes through the perforation or perforations of the bearing-piece and the holes made in the extension of jaw 15 at 34 and in the projection 35 of the pedestal-head. Nuts 36 and 37 allow the bolt and bearing-piece or jaw to be removed when a pair of wheels and an axle are to be rolled out. The function of the flanges $32^2$ and $32^3$ is to relieve the bolt 33 from side strains. The pedestal in this species may be made of cast-steel with one jaw 15 and its extension, the horizontal extension or neck 8 having the recess or recesses in the sides, the stiffening-flanges 13 and 16, the spring pocket or bearing 14, and flange 20 made integral, as shown. The horizontal extension or neck is removably secured in position like that previously described by rivets or bolts, the flanges 9 and 10 overlapping a beam or a transom end, or both, and the flanges 10 taking part of the vertical strains.

Figs. 8, 9, 10, and 11 show a frame and a preferred construction of cast-metal pedestal. In this form the jaws or legs of the pedestal lie in parallel perpendicular planes, bounding on the sides the space for the journal-box, which is inserted and withdrawn at the bottom. The horizontal extension or neck for the attachment of the pedestal to the side frame lies in a plane at right angles to the plane of the jaws or legs, and it may be of any length desired. The numeral 38 designates the horizontal extension or neck. 80 is a web having holes for the rivets or bolts. 81 82 are recesses each side of the web to receive the ends of two beams or plates—in this instance channel-beams—which are also provided with holes. 9 9 are top horizontal flanges extending far enough outwardly to overlap the ends of the two beams or plates of the frame. 10 10 are bottom horizontal flanges extending outwardly to receive the edges of the ends of the two beams or plates. 12 is the head of the pedestal. 45 is a flange extending along the neck and over the pocket or bearing for the spring. When a simple horizontal bearing for the spring is used, this flange or two flanges should be present to secure the requisite strength for the head. When the pocket is present, the flange or flanges may be omitted, as the walls of the pocket will provide ample metal to resist all strains and blows. 39 is the pocket or bearing of any suitable depth for the end of the spring; 40, the pedestal jaw or leg adjacent the extension or neck; 20, the bearing-flange of the jaw; $45'$, the strengthening-flange of the jaw; 83, the outer jaw or leg, formed integral with the pedestal; 41, the bearing-flange; 84, the perpendicular strengthening-flange for the jaw, extending at least to the pocket or bearing; 42, a perforated removable tie-piece uniting the ends of the jaws, which latter in this instance are provided with slots or holes to receive the ends of the tie-piece, and 43 44 are bolts to secure the tie-piece in place. The main frame is similar to those shown in Figs. 1, 2, 3, and 4. The numeral 1 designates the transoms—in this example channel-beams—each having its ends bent or fashioned to curved shapes. 2 represents the bent ends, which rest on the extensions or necks of the pedestals and are secured thereto. 3 represents the side beams or pieces. 4 represents top plates riveted to the transoms and side pieces for the purpose of stiffening the frame and to hold the transom ends to the side pieces. 5 represents bottom plates similar to the top plates and also riveted to the side pieces and transoms for a like purpose, and 46 represents rivets which secure the sides and transoms to the extensions or necks of the pedestals.

As shown in Figs. 8 and 9, the journal-boxes have vertical movements between the pedestal-jaws, and the springs are interposed between the boxes and pedestals, so that they support the entire load above the journal-boxes and cushion the frame. In some cases the springs may be omitted; but their presence is in most cases desirable, especially when springs are not used in connection with the transom or transoms. It will be observed that the ends of the transoms are secured to the extensions or necks of the pedestals, that they rest upon and are riveted or bolted to them, and that top plates in addition unite the ends of the transoms and the side pieces, forming a very secure and rigid union of the several parts.

The pedestal illustrated by Figs. 12 and 13 is in all respects like that shown in Figs. 8, 9, 10, and 11, with the exception of the construction of the extension or neck 38. This has a web 85 of any desired thickness and a single recess 86 for the reception of an end frame or an end of a side piece or beam. The end of a transom may be secured to the extension or neck of this pedestal or, as previously indicated, to the side piece or beam, or to both pedestal extension and side piece, as may be found desirable.

Fig. 14 illustrates a section of a species of the frame in which the U-shaped transoms 47 are fashioned or bent so that the flanges 48 face each other and the flanges 49 of the side pieces 50 face the flanges of the curved ends of the transoms. 51 designates filling-pieces placed between the flanges and riveted in place, and 6 is a center plate. The dotted lines indicate the sectional ends of the beams. Pedestals for this style of frame should be shaped to fit the ends of the side and transom-channels or transom-channel and side piece.

Figs. 15 and 16 illustrate a novel form of pedestal secured to the end of a channel-beam and having a removable jaw, (designated by 22.) It is rectangular or curved in shape and guides one side of the journal-box and closes the space below the journal-box. A flange 23 stiffens the jaw. This jaw is detachably secured to the pedestal at one end by the bolt 24 and at the other end to the leg 25 by the bolt 26. The head of the pedestal is provided with a pocket for a spring. 38 is the neck, 53 one end of a channel-beam side frame, and 54 represents rivets.

It will be observed that in each example of the truck-frames specifically described the main frame embraces side frames or beams having four free ends, transoms located between the pairs of wheels and axles and uniting the side frames at their centers or adjacent thereto, and pedestals attached directly to the free ends of the side frames. The weight is first taken by the transom or transoms and then transferred to the side frames and pedestals. Four species of pedestals are shown, each having in common a horizontal extension or neck, a perpendicular jaw adjacent the extension, and a bearing or pocket for a spring, whereby the several pedestals are interchangeable and each is adapted to be secured to the end of the side frame or to a side piece or transom end, or to both.

From the foregoing description it is obvious that we have produced truck-frames and pedestals which fulfil all the conditions set forth as the object or end of our invention, besides possessing many other desirable features and characteristics. The frame will keep square. The side frames will not bend laterally or vertically between the journal-boxes and centers of the side frames. The pedestals are easily removable and by their flanges insure ample strength and take in the preferred form the weight of the load to the journal-boxes.

In each of the trucks we have shown the pedestals secured to the ends of the side frames and in such a way that the lower horizontal edges of said frames are in a line below the tops of the journal-boxes. This disposition is desirable, as it allows the side frames to take the thrust of the journal-boxes direct and prevents the tendency to twist the pedestals. Further, we have shown the ends of the transom-beams extended to the pedestals and regard such arrangement as preferable in most cases. However, when desired they may be attached to the side pieces only and not extended to the pedestals. As our trucks have been designed especially for use under heavy cars where the weight is taken by a center plate or bolster, we have united the side frames by heavy flanged transoms located between the wheels and axles and have left the ends of the side frames free—that is, the ends of the frames are not united outside the wheels; but in some cases we may so unite them. We have shown the ends of the side frames or sides and transoms cut off square or free with plain ends and the necks of the pedestals attached directly to the free ends of the frames and regard this as the best practice; but the ends of the frames may be somewhat altered in shape. Still further, in the main forms we have shown each pedestal provided with an extension or neck having a recess or seat on each side and flanges. When attached to a transom end only or to a side piece only, the extension should have but one recess or seat, although when so made it may be secured to both a side piece and a transom end.

We wish it understood that the several specimens of truck-frames, pedestals, and supplemental parts illustrated in Figs. 1 to 16, inclusive, are given merely as examples of our way or method of constructing to attain the purposes or ends hereinbefore set forth. They disclose several but not all the modes of the physical embodiment of our invention. They are not exhaustive of it. While we have illustrated channel-beams as constituting the main elements of our truck-frames — that is, the transoms and side pieces—other and preferably merchant and pressed-steel shapes may be employed for either transoms or side pieces, or both, such as ⌐L ⊤⌐ U I and other integral or composite beams or plates. Pedestals of a different construction may be used in connection with the sides and transoms or side frames. Moreover, parts of our truck may be abstracted—for example, one transom and two pedestals—and be combined with side pieces which support pedestals of a similar or dissimilar formation at their opposite ends. The springs may be omitted in some cases and the transoms united to form one transom. Changes likewise may be made in the form or shape, proportions, dimensions, disposition, construction, and number of the several parts or elements of our complete truck and such embodiments still fall within the scope of our invention. We shall regard such changes, abstractions, or modified formations as infringements when our mode of constructing and combining is substantially followed in whole or in part for the same purposes or for attaining the same ends.

What we claim is—

1. The combination in a truck, of flanged beams fashioned or bent to a U shape constituting the transoms and portions of the side frames; and plates or side pieces forming other portions of the side frames and secured to the flanged beams.

2. The combination in a truck, of flanged beams fashioned or bent to a U shape constituting the transoms and portions of the side frames; and flanged beams forming other portions of the side frames and secured to the U-shaped flanged beams.

3. The combination in a truck, of channel-beams fashioned or bent to a U shape constituting the transoms and portions of the side frames; and channel-beams forming other portions of the side frames and secured to the U-shaped channel transom-beams.

4. The combination in a truck of flanged beams fashioned or bent to a U shape constituting the transoms and portions of the side frames; side beams or pieces; and supplemental means for uniting the said flanged beams and the said side beams or pieces.

5. The combination in a truck structure, of beams fashioned to a U shape and constituting the transoms; side beams or plates; and means for uniting the U-shaped beams and the side beams; said U-shaped beams and said side beams being so relatively located that their webs are not in frictional contact.

6. The combination in a truck structure, of U-shaped beams constituting the transoms; side beams or plates; and filling-pieces between the U-shaped beams and side beams or plates.

7. The combination in a truck structure, of flanged beams fashioned to a U shape constituting the transoms and portions of the side frames; side plates or beams; and flat plates secured to the U-shaped beams and to the side plates or beams.

8. The combination in a truck structure, of channel-beams fashioned or bent to form the transoms and portions of the side frames; side beams; and filling-pieces having flanges.

9. The combination in a truck structure, of channel-beams fashioned or bent to form the transoms and portions of the side frames; side beams; and plates secured to and uniting the said transom-beams and side beams.

10. The combination in a truck structure, of flanged beams fashioned or bent to a U shape constituting the transoms and portions of the side frames; plates or side pieces forming other portions of the side frames; and suitable pedestals for the side frames.

11. The combination in a truck structure, of flanged beams fashioned or bent to a U shape constituting the transoms and portions of the side frames; plates or side pieces forming other portions of the side frames and secured to the flanged beams; and pedestals secured to the side frames.

12. The combination in a truck structure, of flanged beams fashioned or bent to a U shape constituting the transoms and portions of the side frames; side beams forming other portions of the side frames; and pedestals secured to the side beams of the side frames.

13. The combination in a truck structure, of flanged beams fashioned or bent to a U shape constituting the transoms and portions of the side frames; beams or plates forming other portions of the side frames; and pedestals secured to the U-shaped beams.

14. The combination in a truck structure, of flanged beams fashioned or bent to a U shape constituting the transoms and portions of the side frames; beams or plates forming other portions of the side frames; and pedestals secured to the U-shaped beams and the beams or plates forming other portions of the side frames.

15. The combination in a truck structure, of flanged beams fashioned or bent to a U shape constituting the transoms; side beams or pieces located outside the wheels and secured to the sides of the U-shaped transoms; and pedestals having flanged jaws and extensions or necks secured to the vertical ends of the side frames.

16. The combination in a truck structure, of channel-beams fashioned or bent to a U shape constituting the transoms and portions of the side frames; side beams or pieces forming other portions of the side frames; and pedestals having extensions or necks secured between the ends of the channel-beams and side beams or pieces.

17. The combination in a truck, of channel-beams fashioned or bent to a U shape constituting the transoms and portions of the side frames; channel-beams forming other portions of the side frames; and pedestals secured to the ends of the U-shaped channel-beams and channel side beams.

18. The combination in a truck, of flanged beams of U shape forming the transoms and portions of the side frames; beams forming other portions of the side frames; and pedestals secured directly to the ends of the side frames.

19. The combination in a truck, of flanged beams of U shape forming the transoms and portions of the side frames; flanged beams forming other portions of the side frames; and pedestals secured to the ends of the side frames.

20. In a car-truck the connected side beams having their upper and lower flanges turned outwardly, combined with the cast-metal pedestals secured to the vertical ends of said side beams, and the top plates at the sides of the truck secured to the side beams and transom-beams.

21. The combination in a truck structure, of channel side beams; flanged beams fashioned or bent to a U shape constituting the transoms and parts of the side frames; and pedestals.

22. The combination in a truck structure of side beams or pieces; flanged beams fashioned or bent to a U shape constituting the transoms and parts of the side frames; means uniting the transoms and side beams or pieces; and pedestals.

23. The combination in a truck structure of side beams; flanged beams fashioned or bent to a U shape constituting the transoms and parts of the side frames; and pedestals secured to the perpendicular ends of the side frames.

24. The combination in a truck, of side pieces; flanged beams fashioned or bent to a U shape constituting the transoms and portions of the side frames; and pedestals at the ends of the side frames.

25. The combination in a truck, of side pieces located outside the wheels; flanged transoms fashioned or bent to a U shape; and pedestals each having a flange 20 secured to the perpendicular ends of the side pieces.

26. The combination in a truck, of U-shaped flanged beams constituting the transoms; side beams or plates; separate plates rigidly uniting the U-shaped beams and side beams or plates; and pedestals; the said U-shaped beams having their ends bent on curves so as to lie in planes parallel with the side beams or plates.

27. The combination in a truck, of flanged U-shaped transoms; side pieces; separate top plates uniting the transoms and side pieces; and pedestals attached to the side frames; the said transoms having the flanges of their ends bent on curves, and the ends extended to the pedestals.

28. The combination in a truck, of flanged U-shaped transoms; flanged side pieces; separate top plates; and detachable pedestals; the webs and flanges of the ends of the transoms being bent on curves, and extended to the pedestals.

29. The combination in a truck, of channel-beams constituting the transoms and having their webs and flanges bent on curves; side pieces; pedestals detachably secured on the vertical ends of the side frames and in line therewith; and separate top plates uniting the transoms and side pieces adjacent the centers of the latter.

30. The combination in a truck, of channel-beams having their webs and flanges bent on curves at the ends and constituting the transoms; channel side pieces; cast pedestals; and separate top plates; the said pedestals being secured upon the vertical ends of the side frames, whereby the frame is lowered.

31. The combination in a truck, of channel-beam transoms; flanged side pieces; and pedestals; the ends of the transoms being bent and extended to the pedestals.

32. The combination in a truck, of rolled channel-transoms; side beams or plates; and detachable pedestals having seats for springs and secured upon the vertical ends of the beams; the ends of the transoms being bent on curves, extended parallel with the side plates, and secured thereto by suitable means.

33. The combination in a truck, of rolled channel-transoms having their ends bent on curves; channel side pieces; cast pedestals secured upon the vertical ends of the side frames and in line therewith; and separate plates riveted to the transoms and side pieces at their junctions.

34. The combination in a truck, of channel-beam transoms having their ends bent on curves; channel-beam sides with their flanges extending outwardly; means for uniting the transoms and sides; and cast-metal pedestals with extensions or necks secured on the vertical ends of the side frames.

35. In a car-truck, the side beams or pieces combined with cast-metal pedestals on the vertical ends of said side beams, and with flanged transom-beams having their ends bent and turned outwardly and uniting the side beams.

36. The combination in a truck of side pieces; flanged beams fashioned or bent to a U shape constituting the transoms and portions of the side frames; and cast pedestals having openings for the journal-boxes; and means for closing the openings.

37. The combination in a truck, of side pieces; flanged U-shaped transoms uniting the side pieces; and cast pedestals having jaws with openings at the ends of the jaws; said pedestals being secured to the vertical ends of the side pieces.

38. The combination in a truck, of side pieces located outside the wheels; flanged U-shaped transoms; and cast pedestals having horizontal extensions or necks and secured to the vertical ends of the side frames.

39. The combination in a truck having pedestals, of two cast-metal pedestals each having jaws with flanges 20, 41, an opening at the bottom of the jaws and a recessed extension or neck at right angles to the jaws; side frames to the adjacent ends of which the two cast pedestals are secured; and a metallic beam uniting the adjacent ends of the side frames having the two cast pedestals, said side frames being located outside the wheels.

40. The combination in a truck having pedestals, of two cast-metal pedestals each having jaws with bearing-flanges for a journal-box, an opening at the bottom of the jaws and an extension or neck at right angles to the jaws; side frames to the adjacent and vertical ends of which the pedestals are secured; and a metallic beam fashioned or bent to a U shape and uniting the adjacent ends of the side frames.

41. The combination in a truck structure of side frames; cast pedestals with bearing-flanges for journal-boxes secured to the vertical ends of the side frames; flanged transoms having their ends bent and secured to the side frames; and supplemental means uniting the transoms and side frames at their centers.

42. The combination in a truck structure of flanged transoms having bent ends; side frames; cast pedestals detachably secured to the vertical ends of the frames; and stiffening-plates secured to the side frames and transoms.

43. The combination in a truck structure, of rolled flanged beams having their ends fashioned or bent on curves to form U-shaped beams and constituting the transoms; side plates or beams; and detachable cast-metal pedestals at the ends of the side plates or beams.

44. The combination in a truck, of plates or beams fashioned or bent to a U shape and constituting the transoms and portions of the side frames; plates or beams forming other portions of the side frames; pedestals having seats for springs; journal-boxes; and springs interposed between the journal-boxes and the seats of the pedestals.

45. The combination in a truck of flanged beams bent to a U shape and forming part of the side frames; side pieces; pedestals having seats for springs and riveted upon the vertical ends of the side frames; journal-boxes; and springs; the said springs bearing on the journal-boxes and located in line with the pedestal-jaws.

46. The combination in a truck structure, of two flanged transom-beams between the pairs of wheels; two flanged side beams; cast pedestals secured to the vertical ends of the side beams; and stiffening-plates uniting the transoms and side beams.

47. The combination in a truck structure, of metallic side frames located outside the wheels; pedestals having jaws with bearing-flanges and necks with recesses secured to the ends of the side frames; and flanged transom-beams, having their webs in vertical planes, secured to the side frames midway of their lengths.

48. The combination in a truck structure, of a transom or transoms located between the pairs of wheels and adapted to support a car-body; side frames or pieces located outside the wheels, cut off or fashioned square at the ends and united adjacent their central portions to the transom or transoms; and cast-metal pedestals having extensions at right angles to the jaws secured onto the ends of the side frames or pieces.

49. The combination in a truck structure, of a transom or transoms located between the pairs of wheels and adapted to support a car-body; side frames or pieces located outside the wheels cut off or fashioned square at the ends and united adjacent their centers to the transom or transoms; and cast-metal pedestals having flanged jaws, top and bottom extensions at right angles to the pedestal-jaws and seats or pockets for springs; said pedestals being secured onto the ends of the side frames or pieces.

50. The combination in a truck structure, of a transom or transoms located between the pairs of wheels and adapted to support a car-body; side frames or pieces located outside the wheels cut off or fashioned square at the ends and united adjacent their central portions to the transom or transoms; means for stiffening the frames at the junction of the side frames and transom or transoms; and cast-metal pedestals having flanged jaws, extensions at right angles to the jaws, and seats or pockets for springs; said pedestals being secured onto the ends of the side frames or pieces.

51. The combination in a truck structure, of a transom or transoms located between the pairs of wheels and adapted to support a car-body; side frames or pieces located outside the wheels, cut off or fashioned square at the ends and united adjacent their central portions to the transom or transoms; cast-metal pedestals having seats for springs, flanged jaws, and extensions at right angles to the jaws, and said extensions secured to the vertical ends of the side frames or pieces; springs; and journal-boxes guided by the flanges of the pedestal-jaws.

52. The combination in a truck structure, of a transom or transoms adapted to support a car-body and located between the pairs of wheels; flanged side frames or pieces located outside the wheels cut off or fashioned square at the ends and united by the transom or transoms; and cast-metal pedestals, each having an extension at right angles to the bearings for the journal-box, secured to the ends of the side frames or pieces.

53. The combination in a truck structure of a transom or transoms located between the pairs of wheels and adapted to support a car-body; flanged side frames or pieces located outside the wheels, cut off or fashioned to form plain ends and united by the transom or transoms; and cast-metal pedestals having flanged jaws, seats for springs and extensions at right angles to the jaws, said extensions being secured to the vertical ends of the side frames or pieces.

54. The combination in a truck structure, of a transom or transoms located between the pairs of wheels and adapted to support a car-body; channel side frames or pieces located outside the wheels, cut off or fashioned square at the ends; and pedestals having flanged jaws and extensions at right angles to the jaws secured to the vertical ends of the channel side frames.

55. The combination in a truck structure, of a transom or transoms located between the pairs of wheels and adapted to support a car-body; rolled flanged beams constituting the side frames and cut off at the ends through the flanges and webs; and cast-metal pedestals secured onto the vertical ends of the rolled and flanged side frames.

56. Two truck side frames composed of flanged beams, each frame having at the ends castings, each casting adapted to receive a spring and a journal-box, and having a recess which receives the web and flanges of the end of a side frame, combined with a transom or transoms which unite said side frames.

57. The combination in a truck structure, of a transom or transoms located between the pairs of wheels and adapted to support a car-body; flanged side frames or pieces having their top flanges in straight horizontal lines from end to end and their lower flanges below the tops of the journal-boxes; and cast-metal pedestals secured directly onto the ends of the side frames, said pedestals being provided with seats or pockets for springs.

58. The combination in a car-truck structure, of a transom or transoms located between the pairs of wheels and adapted to support a car-body; flanged side frames or pieces located outside the wheels and having their lower flanges in straight horizontal lines from end to end; and cast metallic pedestals with jaws having bearing-flanges, said pedestals secured directly onto the ends of the side frames, and projecting beyond the same.

59. The combination in a truck structure, of a transom or transoms located between the pairs of wheels and adapted to support a car-body; flanged side frames or pieces having their top and bottom flanges in straight horizontal lines from end to end; and cast-metal pedestals provided with jaws having bearing-flanges, said pedestals secured directly onto the ends of the side frames and extending beyond the webs thereof.

60. The combination in a truck structure, of a transom or transoms located between the pairs of wheels and adapted to support a car-body; flanged side frames or pieces located outside the wheels and having the top flanges in straight horizontal lines from end to end; and pedestals secured directly onto the ends of the side frames; said pedestals having flanged jaws, extensions at right angles to the pedestal-jaws; and seats for springs.

61. The combination in a truck structure, of a transom or transoms located between the pairs of wheels and adapted to support a car-body; flanged side frames or pieces located outside the wheels and having the top flanges in straight horizontal lines from end to end; and pedestals secured directly onto the ends of the side frames; said pedestals having extensions at right angles to the jaws.

62. The combination in a truck structure, of a transom or transoms located between the pairs of wheels and adapted to support a car-body; flanged side frames or pieces located outside the wheels and cut off or fashioned square; and cast pedestals having seats for springs and flanged jaws, and secured directly onto the ends of the side frames; the tops or heads of the pedestals extending above the plane of the side frames, whereby the seats for the springs may be located above the planes of the side frames and the transom or transoms dropped.

63. The combination in a car-truck structure, of a transom or transoms located between the pairs of wheels and adapted to support a car-body; flanged side frames located outside the wheels and having their upper and lower flanges in parallel planes and their ends cut off through the flanges and webs; and metallic pedestals having jaws with bearing flanges and extensions at right angles to the jaws and comprising upper and lower portions located in frictional contact with the top and bottom flanges of the ends of the side frames when the pedestals are secured in position.

64. The combination in a truck structure, of a transom or transoms located between the pairs of wheels and adapted to support a car-body; rolled flanged beams located outside the wheels constituting the side frames and having their flanges and webs cut off at the ends; and cast-metal pedestals secured onto the webs of the rolled flanged beams at their ends; the said pedestals having seats or pockets for springs, and the pedestal-jaws extending below the lower flanges of the side frames.

65. In a car-truck a transom or transoms and side beams secured thereto, the latter having their upper and lower flanges turned outwardly, combined with the cast-metal pedestal-frames riveted to the vertical ends of the said side beams, and the top plates at the sides of the truck riveted to the side beams and transom beam or beams.

66. The combination in a truck structure of flanged transoms located between the pairs of wheels and adapted to support a car-body; side frames or pieces cut off or fashioned to form plain ends and to which the transom-beams are attached; and cast-metal pedestals having extensions at right angles to the jaws secured onto the ends of the side frames or pieces.

67. The combination with a car-truck comprising flanged transoms adapted to support a car-body, side frames or pieces to which the transom-beams are attached and cast-metal pedestals having seats for springs secured onto the vertical, unbent ends of the side pieces or frames, of journal-boxes; and springs interposed between the pedestals and journal-boxes.

68. The combination in a truck structure, of flanged transoms located between the pairs of wheels and adapted to support a car-body; side frames or pieces located outside the wheels, cut off or fashioned to form plain ends and secured to the ends of the transoms; means for stiffening the transoms and side frames at their junctions; and cast-metal pedestals, having jaws and seats for springs and extensions at right angles to the pedestal-jaws, secured to the ends of the side frames or pieces.

69. The combination in a truck structure, of flanged transoms; channel side frames with their flanges turned outwardly; and cast-metal pedestals; each pedestal having a web, and flanges which overlap the channel side frame and said pedestal also secured to a transom.

70. The combination in a truck structure, of flanged transoms; channel side frames; and cast-metal pedestals secured onto the ends of the side frames; each pedestal having a web and flanges and secured to a transom; and said channel side frames and transoms being provided with stiffening means at their junctions.

71. The combination in a truck structure, of flanged transoms; channel side frames; and pedestals having extensions with webs and flanges; the flanges of a pedestal overlapping the end of a channel, and a transom secured to the extension.

72. The combination in a truck structure, of flanged transoms; channel sides; and cast-metal pedestals having extensions at right angles to the jaws; the extension of each pedestal being secured to a channel side piece and to a transom.

73. The combination in a truck structure, of flanged transoms located between the pairs of wheels and adapted to support a car-body; channel side pieces or beams cut off or fashioned to form plain ends; and cast-metal pedestals having extensions secured to the vertical ends of the side frames or pieces.

74. The combination in a truck structure, of flanged transoms located between the pairs of wheels and adapted to support a car-body; channel-beam side frames or pieces located outside the wheels and having their upper and lower flanges in parallel lines; and pedestals having extensions at right angles to the jaws secured onto the ends of the said side frames or pieces.

75. The combination in a truck structure, of flanged transoms; side channel-frames; and cast-metal pedestals; each pedestal having an extension which is secured to the end of a channel side frame and to a transom adjacent its end.

76. The combination in a truck structure, of flanged transoms located between the pairs of wheels and adapted to support a car-body; flanged side frames or pieces cut off or fashioned to form plain ends; and pedestals secured onto the vertical ends of the flanged side frames or pieces.

77. The combination in a truck structure, of flanged transoms located between the pairs of wheels and adapted to support a car-body; flanged side frames or pieces cut off or fashioned to form plain ends; and pedestals having seats or pockets for springs and secured onto the vertical ends of the flanged side frames.

78. The combination in a truck structure, of flanged transoms located between the pairs of wheels and adapted to support a car-body; flanged side frames or pieces located outside the wheels and having their flanges and webs cut off or fashioned to form plain ends; and cast-metal pedestals secured to the side frames; each pedestal being provided with an extension at right angles to the jaws and adjacent the lower flange of a side frame.

79. The combination in a truck structure, of flanged transoms; flanged side frames cut off through the flanges and webs to form plain ends; and cast-metal pedestals having extensions secured onto the vertical ends of the side frames; the extension of each pedestal frictionally engaging and riveted to the web of the end of a side frame.

80. The combination in a truck, of cast-metal pedestals having extensions or necks and jaws with bearing-flanges for journal-boxes; flanged side frames or beams to the vertical ends of which the extensions of the pedestals are secured by rivets; and flanged transoms uniting the flanged side beams adjacent their centers; said transoms being adapted to support a car-body.

81. The combination in a truck structure, of flanged transoms; flanged side frames or pieces located outside the wheels and having the flanges and webs cut off to form plain ends; and cast-metal pedestals with bearing-flanges for engaging the journal-boxes, said pedestals having top and bottom extensions engaging the top and bottom flanges of the side frames.

82. The combination in a truck structure, of flanged transoms located between the pairs of wheels and adapted to support a car-body; flanged side frames or pieces cut off or fashioned to form plain ends; flat plates riveted to the transoms and side frames at their junctions; and cast-metal pedestals secured onto the vertical ends of the side frames.

83. The combination in a truck structure, of flanged transoms located between the wheels and adapted to support a car-body; flanged side frames or pieces located outside the wheels and cut off or fashioned to form plain ends and united to the ends of the transoms; and cast-metal pedestals having extensions at right angles to the pedestal-jaws secured onto each of the four ends of the side frames.

84. The combination in a truck structure, of flanged transoms located between the wheels and adapted to support a car-body; flanged side frames or pieces cut off or fashioned to form plain ends; means secured to the transoms and side frames at their junctions to stiffen the frame; cast-metal pedestals having extensions, seats for springs, and jaws, and secured onto the vertical ends of the side frames; coiled springs; and journal-boxes movable between the jaws of the pedestals.

85. The combination in a truck structure, of flanged transoms located between the pairs of wheels and adapted to support a car-body; flanged side frames or pieces located outside the wheels and having their flanges and webs cut off or fashioned substantially square and perpendicular to the lengths of the said frames or pieces; and cast-metal pedestals with flanged jaws to engage journal-boxes secured directly onto the ends of the side frames or pieces and projecting from the ends thereof; in substance as set forth.

86. The combination in a truck structure, of flanged transoms located between the pairs of wheels and adapted to support a car-body; flanged side frames or pieces located outside the wheels and having their top and bottom flanges in parallel lines; and cast-metal pedestals with flanged jaws secured onto the four vertical ends of the side frames or pieces.

87. The combination in a truck structure, of flanged transoms located between the pairs of wheels and adapted to support a car-body; flanged side frames or pieces having their top and bottom flanges in parallel lines; and cast-metal pedestals provided with seats for springs secured onto the four vertical ends of the side frames or pieces.

88. The combination in a truck structure, of flanged transoms located between the pairs of wheels and adapted to support a car-body; rolled flanged beams located outside the wheels and constituting the side frames and having their flanges and webs cut off at the ends; and cast-metal pedestals with flanged jaws secured onto the vertical ends of the rolled flanged beams.

89. The combination in a truck structure, of flanged transoms located between the pairs of wheels and adapted to support a car-body; flanged side frames or pieces located outside the wheels and cut off or fashioned to form plain ends; and cast-metal pedestals having extensions at right angles to the jaws secured onto the ends of the flanged side frames.

90. The combination in a truck structure, of flanged transoms located between the pairs of wheels and adapted to support a car-body; flanged side frames or pieces cut off or fashioned to form plain ends; stiffening-pieces riveted to the transoms and side frames; and metallic pedestals secured onto the vertical ends of the side frames.

91. The combination in a truck structure, of flanged transoms located between the pairs of wheels and adapted to support a car-body; flanged side frames or pieces having their lower flanges in straight horizontal lines from end to end and below the tops of the journal-boxes; cast pedestals secured directly onto the ends of the side frames, said pedestals being provided with seats or pockets for springs; and suitable means for stiffening the joints or unions between the transoms and sides.

92. The combination in a truck structure, of two flanged transom-beams adapted to support a car-body; two rolled flanged side beams located outside the wheels and united adjacent their centers by the said transom-beams; and cast-metal pedestals with flanged jaws secured onto the webs of the vertical ends of the side beams.

93. The combination in a truck structure, of two flanged transom-beams; two flanged side beams having webs; and pedestals of cast metal having seats or pockets for springs and secured onto the webs of the side frames at their vertical ends.

94. The combination in a truck structure, of flanged transoms located between the pairs of wheels and adapted to support a car-body; flanged side frames or pieces located outside the wheels and having the top flanges in straight horizontal lines from end to end; and pedestals secured directly onto the ends of the side frames; said pedestals having extensions at right angles to the jaws.

95. The combination in a truck structure, of two flanged transom-beams; two flanged side beams united adjacent their centers by the said transom-beams; cast-metal pedestals secured to the ends of the side beams; coiled springs; seats for the springs; and journal-boxes which bear against the springs and have vertical movement between the jaws of the cast pedestals; the said springs being located adjacent the vertical ends of the side frames.

96. The combination in a truck structure, of two flanged transom-beams; two flanged side beams having free ends and webs and located outside the wheels; and pedestals secured to the ends of the side beams, each pedestal embracing a flanged jaw adjacent the frame, an outer flanged jaw, a seat for a spring, and an extension at the top at right angles to the jaws.

97. In a car-truck, the flanged transom-beams, and flanged side beams located outside the wheels and having their webs in vertical planes, combined with the cast-pedestal frames each having a vertical web flange to engage the end of a side beam, a lower horizontal flange, and jaws for receiving a journal-box.

98. The combination in a truck structure, of flanged transoms; flanged side frames; and cast-metal pedestals; said pedestals being secured to the ends of the side frames and also to the transoms.

99. A truck side frame composed of a flanged beam and end castings formed with extensions, in combination with transoms of flanged beams which contact with and are riveted to the extensions of the pedestals.

100. The combination in a truck structure, of flanged transoms; flanged side frames; and cast-metal pedestals with extensions at right angles to the jaws; each pedestal extension being secured to a side frame at the end thereof and the end of each transom resting on a flange of a pedestal extension.

101. The combination in a truck structure, of channel-beam transoms located between the pairs of wheels and adapted to support a car-body; channel-beam side frames or pieces cut off or fashioned to form plain ends; means secured to the transoms and side frames or pieces at their junctions to stiffen the frame; cast-metal pedestals having extensions, seats for springs, and jaws, and said pedestals secured onto the vertical ends of the side frames; springs; and journal-boxes movable between the pedestal-jaws and bearing against the springs.

102. The combination of a truck structure, of channel-beam transoms located between the pairs of wheels and adapted to support a car-body; channel-beam side frames or pieces located outside the wheels and cut off or fashioned to form plain ends; and pedestals with seats for springs and flanged jaws secured onto the vertical ends of the channel side frames or pieces.

103. The combination in a truck structure, of channel-beam transoms located between the pairs of wheels and adapted to support a car-body; channel-beam side frames or pieces cut off or fashioned to form plain ends; and pedestals having seats or pockets for springs secured onto the vertical ends of the channel side frames or pieces.

104. The combination in a truck structure, of channel-beam transoms located between the pairs of wheels and adapted to support a car-body; channel-beam side frames or pieces located outside the wheels and cut off or fashioned to form plain ends; and cast-metal pedestals having extensions at right angles to the jaws secured onto the channel side frames or pieces.

105. The combination in a truck structure, of channel-beam transoms located between the pairs of wheels and adapted to support a car-body; channel-beam side frames or pieces cut off or fashioned to form plain ends; stiffening-pieces riveted to the transoms and side frames; and metallic pedestals secured onto the vertical ends of the side frames.

106. The combination in a truck structure, of channel-beam transoms located between the pairs of wheels and adapted to support a car-body; channel-beam side frames or pieces cut off or fashioned to form plain ends; flat stiffening-plates riveted to the transoms and side frames at their junctions; and cast-metal pedestals secured onto the vertical ends of the side frames or pieces.

107. The combination in a truck structure, of channel-beam transoms located between the pairs of wheels and adapted to support a car-body; channel-beam side frames or pieces located outside the wheels and cut off or fashioned to form plain ends and united to the ends of the transoms; and cast-metal pedestals having extensions at right angles to the jaws secured to the four ends of the side frames.

108. The combination in a truck structure, of channel-beam transoms located between the pairs of wheels and adapted to support a car-body; channel-beam side frames or pieces located outside the wheels and having their top and bottom flanges in parallel lines; and cast-metal pedestals with flanged jaws secured onto the four vertical ends of the side frames or pieces.

109. The combination in a truck structure, of channel-beam transoms located between the pairs of wheels and adapted to support a car-body; channel-beam side frames or pieces having their top and bottom flanges in parallel lines; and cast-metal pedestals, provided with seats for springs, secured onto the vertical ends of the side frames or pieces.

110. The combination in a truck structure, of channel-beam transoms located between the pairs of wheels and adapted to support a car-body; channel-beam side frames or pieces located outside the wheels and having their flanges and webs cut off substantially square and perpendicular to the length of the said frames or pieces; and cast-metal pedestals with flanged jaws secured directly onto the ends of the side frames or pieces and projecting from the ends thereof; in substance as set forth.

111. The combination in a truck structure, of channel-beam transoms located between the pairs of wheels and adapted to support a car-body; rolled channel-beam side frames located outside the wheels and cut off through the flanges and webs; and cast-metal pedestals with flanged jaws secured onto the vertical ends of the rolled channel-beam side frames.

112. The combination in a car-truck structure, of channel-beam transoms located between the pairs of wheels and adapted to support a car-body; flanged side frames or pieces located outside the wheels and having their webs and flanges cut off or fashioned to form plain ends; and cast-metal pedestals with flanged jaws secured to the four ends of the side frames or pieces; each of said pedestals having an extension at right angles to the jaws and adjacent the lower flange of a side frame.

113. The combination in a truck structure, of channel-transoms; channel side frames; and cast-metal pedestals; each pedestal having an extension at right angles to the jaws, a bottom flange which is in contact with a channel side frame, and a web which engages the side of a channel side frame; and the extension of a pedestal secured to a transom adjacent the end thereof.

114. The combination in a truck structure, of channel-beam transoms located between the pairs of wheels and adapted to support a car-body; flanged side frames or pieces cut off or fashioned to form plain ends; stiffening-pieces riveted to the transoms and side frames or pieces at their junctions; and cast-metal pedestals provided with seats for springs secured onto the vertical ends of the side frames.

115. The combination in a truck structure, of channel-beam transoms located between the pairs of wheels and adapted to support a car-body; flanged side frames or pieces having their lower flanges in straight lines; and cast-metal pedestals provided with seats for springs secured onto the vertical ends of the side frames or pieces.

116. The combination in a truck structure, of channel-beam transoms located between the pairs of wheels and adapted to support a car-body; flanged side frames or pieces located outside the wheels and having their flanges and webs cut off substantially square and perpendicular to the lengths of the said frames or pieces; and cast-metal pedestals with flanged jaws secured directly onto the ends of the side frames or pieces and projecting from the ends; in substance as set forth.

117. The combination in a truck structure, of channel-beam transoms located between the pairs of wheels and adapted to support a car-body; flanged side frames or pieces cut off or fashioned to adapt them to receive cast-metal pedestals; and cast-metal pedestals secured to the vertical ends of the side frames or pieces; the said pedestals each having an inner jaw adjacent the end of the frame and also provided with a seat for the upper end of a coiled or helical spring the lower end of which is supported by a journal-box.

118. The combination in a truck structure, of channel-beam transoms located between the pairs of wheels and adapted to support a car-body; flanged side frames or pieces located outside the wheels and cut off or fashioned to form plain ends; and pedestals with flanged jaws secured onto the vertical ends of the side frames or pieces.

119. The combination in a truck structure, of channel-beam transoms located between the pairs of wheels and adapted to support a car-body; flanged side frames or pieces located outside the wheels and cut off or fashioned to form plain ends; and cast-metal pedestals having extensions at right angles to the jaws secured onto the ends of the side frames or pieces.

120. The combination in a truck structure, of channel-beam transoms located between the pairs of wheels and adapted to support a car-body; rolled flanged beams located outside the wheels and constituting the side frames and having their ends cut off through the flanges and webs; and cast-metal pedestals with flanged jaws secured to the vertical ends of the rolled and flanged side frames.

121. The combination in a truck structure, of side frames; a transom or transoms located between the pairs of wheels and uniting the side frames adjacent their centers; pedestals of cast metal at the four ends of the frames, each pedestal having an inner vertical jaw, an outer vertical jaw, and a pocket for adding strength at the head of the pedestal; means for closing the opening at the bottom of each pair of jaws; and springs located within the pockets and bearing upon the journal-boxes; the bottom horizontal line of each side frame being located below the horizontal line joining the tops of the journal-boxes, whereby the vertical sides of the journal-boxes will directly take the blows and strains in buffing and in applying the brakes.

122. The combination in a truck structure, of side frames; a transom or transoms located between the pairs of wheels and uniting the side frames adjacent their centers only so that the four ends are free; pedestals of cast metal, each having an inner flanged vertical jaw, an outer flanged vertical jaw, and a pocket for strengthening the head of the pedestal, said jaws and pocket being cast integral; means for closing the opening at the bottom of each pair of jaws; journal-boxes; and springs; said springs bearing upon the journal-boxes and being seated within the pockets; and the lower horizontal edges of the side frames being below the tops of the journal-boxes, whereby the frame is lowered and the journal-boxes located at the extreme ends of the side frames where they can take the blows and strains in horizontal lines.

123. The combination with a pedestal having flanged jaws and an extension on one side only at right angles to the jaws, of two metallic beams, constituting an end of a car-truck side frame secured to the extension, and one of said beams provided with flanges.

124. The combination in a car-truck and with a pedestal having flanged jaws and an extension on one side only at right angles to the jaws, of two flanged metallic beams constituting an end of a car-truck side frame and riveted to the extension.

125. The combination with a pedestal having an extension on one side only and at right angles to the jaws, and a web, of the ends of two flanged metallic beams constituting the ends of a car-truck side frame; the said pedestal-web being secured in position between the ends of the two said flanged beams.

126. The combination with the commercial rolled-beam side frames having substantially vertical ends, of cast-metal flanged pedestals provided with flanged jaws, seats for springs, and each pedestal having a neck on one side only, said pedestals being secured to the vertical ends of the side frames and said frames adapted to support a car-body through the medium of a transom or transoms.

127. A cast-metal pedestal having flanged jaws, a seat for a spring, and an extension at one side thereof only and at right angles to the said jaws, said extension comprising a lower flanged portion and an upper flanged portion between which a flanged end of a car-truck side frame is secured.

128. A cast-metal pedestal having flanged jaws, a seat for a spring, and an extension on one side thereof only and at right angles to the said jaws, said extension comprising a lower flanged portion and a web to which an end of a car-truck frame is secured.

129. A cast-metal pedestal having flanged jaws, a seat for a spring, and an extension on one side thereof only and at right angles to the said jaws, said extension comprising a lower flanged portion, a web, and an upper flanged portion, and to which extension an end of a car-truck frame is secured.

130. A cast-metal pedestal having jaws which engage the sides of a journal-box and guide the same, a seat for a spring, and an extension on one side thereof only and at right angles to the said jaws, said extension comprising a lower flanged portion, an upper flanged portion and a seat or recess for an end of a car-truck frame, and to which the pedestal is secured.

131. A cast-metal pedestal having jaws which engage the sides of a journal-box, a seat for a spring, and an extension on one side thereof only and at right angles to the said jaws, said extension comprising a lower flanged portion, an upper flanged portion and two seats or recesses for the end of a car-truck frame and to which the extension is secured.

132. A cast-metal pedestal having jaws, a pocket for the end of a spring, and an extension on one side thereof only comprising a lower flanged portion and an upper flanged portion both at right angles to the said jaws, and to which extension an end of a car-truck frame is secured; the jaws of the pedestal confining a journal-box against endwise movement.

133. The combination with a journal-box having vertical movement only, of a cast-metal pedestal having jaws, a pocket for a spring, and an extension on one side thereof only and at right angles to the said jaws; said extension comprising a lower flanged portion, an upper flanged portion and a web, to which an end of a car-truck frame is secured.

134. The combination with the flanged end of a car-truck frame cut off square, of a cast-metal pedestal having jaws, a seat for a spring, and an extension on one side only at right angles to the jaws, and to which extension the vertical end of the frame is secured.

135. The combination with the flanged end of a car-truck frame, of a cast-metal pedestal having flanged jaws, a pocket for a spring, and an extension on one side only at right angles to the jaws, said extension having a lower flanged portion, an upper flanged portion, and a web, to which the flanged end of the truck-frame is secured.

136. The combination with the flanged end of a car-truck frame, of a cast-metal pedestal having flanged jaws, a pocket for a spring, and an extension on one side only at right angles to the jaws, said extension having a lower flanged portion and a web, to which the said flanged end of the car-truck frame is secured.

137. A cast-metal pedestal having flanged jaws 40 and 83, the latter jaw constituting the end of the casting, a bearing or pocket, as 39, for a spring, and an extension 38 at right angles to the jaws; said extension adapted to be secured to the end of a car-truck side frame.

138. A cast-metal pedestal having flanged jaws 40 and 83, a bearing or pocket 39 for a spring, and an extension 38 at right angles to the jaws; said extension adapted to be secured to the end of a car-truck frame which supports the load on the transoms; and said jaw 83 having a strengthening-flange.

139. A cast-metal pedestal having flanged jaws 40 and 83, a seat or pocket 39 for a spring, and an extension at right angles to the jaws consisting of the flanged parts 9 and 10, as set forth.

140. A cast-metal pedestal having flanged jaws 40 and 83, a seat or pocket 39 for a spring, and an extension comprising the flanged parts 9 and 10 and the web.

141. A cast-metal pedestal having flanged jaws 40 and 83, a seat or pocket 39 for a spring, and an extension provided with the flanged portions 9 and 10 and a recess for the end of a side frame between portions 9 and 10.

142. A cast-metal pedestal having flanged jaws 40 and 83, a seat or pocket 39 for a spring, an extension provided with the flanged portions 9 and 10 and two recesses on opposite sides between portions 9 and 10.

143. A cast-metal pedestal having flanged jaw 40 and jaw 83 provided with a strengthening-flange, a seat or pocket 39 for a spring, and an extension embracing the flanged portions 9 and 10 and two recesses to receive the ends of a frame.

144. A cast-metal pedestal having a flanged jaw 40, a jaw 83 with a strengthening-flange, a seat or pocket 39 for a spring, and an extension provided with the flanged portions 9 and 10 and a recess for the end of a side piece or frame between portions 9 and 10.

145. A cast-metal pedestal having two flanged jaws 40 and 83, a seat or pocket 39 for a spring, and an extension provided with the flanged portion 10, the flanged portion 9 having the flange 45, and a recess to receive the end of a car-truck side frame.

146. A cast-metal pedestal having a flanged jaw 40, a jaw 83 provided with a strengthening-flange, a seat for a spring, and an extension provided with the flanged portion 10, the flanged portion 9 having a flange 45, and two recesses to receive parts of the end of a car-truck side frame.

147. The combination with the end of a truck-frame, of a pedestal having flanged jaws 40 and 83, a seat or pocket for a spring 39, an extension having the flanged parts 9 and 10, and a recess for the end of a car-truck frame between parts 9 and 10.

148. The combination with the end of a truck-frame, of a pedestal having flanged jaws 40 and 83, a seat for a spring 39, and extension 38 provided with the flanged portions 9 and 10, a web, and two recesses.

149. The combination with the end of a car-truck frame, of a cast pedestal having flanged jaw 40, jaw 83 with a strengthening-flange, a seat for a spring 39, and an extension at right angles to the pedestal-jaws; said car-truck frame embracing a transom or transoms adapted to support a car-body.

150. The combination with the end of a car-truck frame, of a pedestal having flanged jaw 40 with a flange 45', jaw 83 with a strengthening-flange, a seat 39 for a spring, and an extension at right angles to the pedestal-jaws.

151. The combination with the end of a car-truck frame, of a pedestal having jaws 40, 83, a seat or pocket 39 for a spring, and an extension at right angles to the jaws secured to the side of the end of the frame; a spring; and a journal-box.

152. A cast-metal pedestal having flanged jaws 40, 83, and an extension at right angles to the jaws provided with the flanged portions 9 and 10 and a web uniting the same.

153. A cast-metal pedestal having flanged jaws 40, 83, and an extension at right angles to the jaws provided with the flanged portions 9 and 10, a web and also having a recess formed by the flanges 9 and 10, and the web.

154. A cast-metal pedestal having flanged jaws 40, 83, and an extension at right angles to the jaws provided with the flanged portions 9 and 10, a web and also having two recesses formed by the flanges 9 and 10, and the web.

155. A cast-metal pedestal having flanged jaws 40, 83, and an extension at right angles to the jaws provided with the flanged portion 9 and a web at right angles thereto.

156. A cast-metal pedestal having flanged jaws 40, 83, and an extension at right angles to the jaws on one side only comprising the lower flanged portion 10 and the upper flanged portion 9, as set forth.

In testimony whereof we affix our signatures in presence of witnesses.

RANSOM C. WRIGHT.
FRANK E. STEBBINS.

Witnesses:
MARK WILKS COLLET,
GEO. W. REED,
GEO. W. MANKIN,
L. L. JOHNSON.